Patented June 7, 1949

2,472,214

UNITED STATES PATENT OFFICE 2,472,214

PRESSURE RESPONSIVE ELECTRICAL RESISTOR

Hyman Hurvitz, Washington, D. C.

Application October 22, 1947, Serial No. 781,286

8 Claims. (Cl. 201—48)

This invention relates generally to aneroid cell or to pressure responsive devices.

Resort has been had in the past primarily to the bellows type of pressure responsive device. Such devices are relatively difficult to fabricate and consequently are expensive. It is the primary object of the present invention to provide a simpler and less expensive type of aneroid cell or pressure responsive device.

Briefly described, the present invention comprises a resistance element fabricated of sponge rubber, or some similar flexible insulating material containing air cells or interstices, which has been impregnated with carbonaceous material, thereby rendering it electrically conductive. The element is surrounded with a flexible plastic or rubber membrane or film, which is, however, impervious to moisture or to gases. Entrapped within the interstices of the element are bubbles of air, which in response to changes in the external pressure with respect to the pressure internally of the cell cause a change in the volume of the element, which is accompanied by a change in electrical resistance. To enable measurements of this resistance a pair of probes is inserted in the cell, and through the membrane, in such manner, however, as not to destroy the impermeability of the membrane or film to gases or liquids. Potential may be applied to the electrodes and the resulting current flow measured as a measure of external pressure, whether of the atmosphere or of other gaseous or liquid material. The device may then be used as an aneroid cell for measuring atmospheric pressure, or it may be used in any other application where pressure of air or liquid is desired to be measured.

Figure 1:
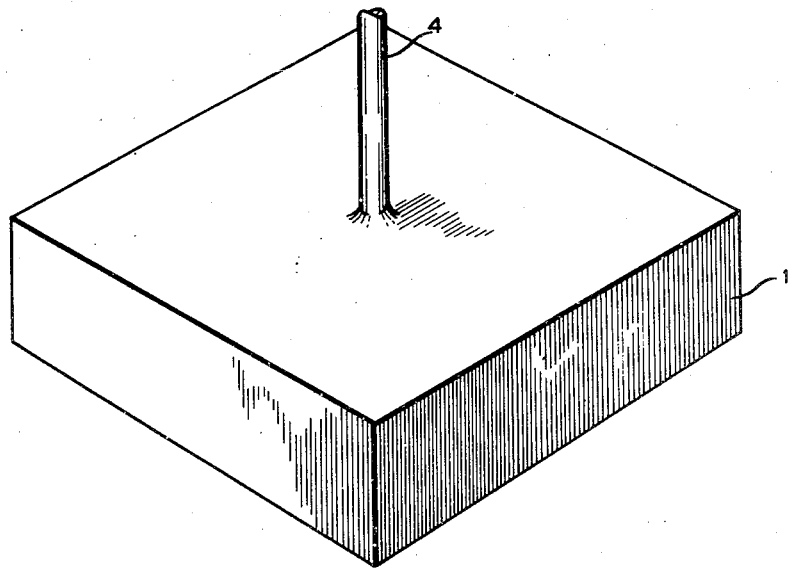
Figure 2:
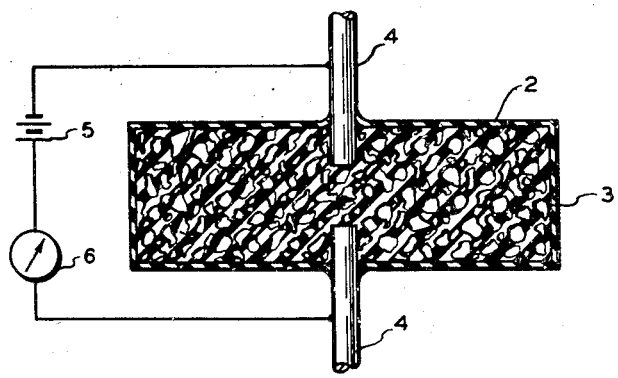

Further features and advantages of this invention will become evident upon study of the following detailed description of one embodiment thereof especially when taken in connection with the accompanying drawings, wherein:

Figure 1 represents in perspective a view of an element or cell fabricated in accordance with the invention; and Figure 2 represents a section taken vertically and centrally through Figure 1.

Referring now specifically to Figure 1 of the drawings the reference numeral 1 denotes a pressure responsive cell, in accordance with the invention. The outer surface of the cell 1 consists of an extremely flexible film, sheath or skin 2, of plastic or rubber, within which is placed a mass 3 of sponge rubber or other similar readily deformable material, which is gas pervious and which has been impregnated with carbonaceous or other electrically conducting material to render it electrically conductive. Extending through the surface 2 is a pair of oppositely directed probes 4 which make contact with the interior material 3 of the cell 1, at two separated points. A conventional type of electric circuit, comprising a battery 5 and a current indicating instrument 6 are shown in series with the probes, for the purpose of measuring the electrical conductivity of the cell.

In operation, air is trapped within the interstices of the mass 3. Changes in pressure external to the skin 2 or sheath modify the shape of the cell 1. For example, if the pressure externally of the cell is greater than the pressure internally of the cell, the cell contracts. On the other hand, if the pressure externally of the cell is less than the pressure internally of the cell, the internal air pressure expands the cell, and its associated flexible sheath 2. These changes in volume of the cell 1 are accompanied by changes in the internal resistance thereof which cause changes in current flowing to the meter 6 in response to the potential battery 5. The current measured by the measuring instrument 6 may be caused to represent external pressure, by suitable calibration of the face of the meter 6.

The cell may be simply constructed, as by impregnating a small mass of sponge rubber, or similar material having suitable interstices or hollow sub-cells, with carbon dust, or a liquid carbon compound or other carbonaceous material. In the event the carbonaceous material is liquid, it should be susceptible of drying. Probes may be inserted at two separated points, into the cell, and the entire resulting unit dipped in latex or other suitable flexible covering material. After the latex has been properly treated and dried, it forms a continuous sheath, impervious to air, gas, or liquid, and sealing the unit and its probes.

While I have described one specific embodiment of my invention, it will be clear that modifications thereof, in respect to general arrangement, specific features of construction, and circuit arrangement, may be resorted to without departing from the true spirit and scope of the invention.

What I claim and desire to secure by Letters Patent of the United States is:

1. In combination, a mass of gas pervious electrically conductive deformable material, a pair of probes inserted therein, and a flexible sheath sealing gas within said mass of gas pervious material and preventing exit or entry of fluid therein and therefrom.

2. In combination, a mass of gas pervious electrically conductive deformable material having gas filled interstices therein, a pair of probes inserted in said material, and a flexible fluid impervious sheath sealing said mass of material.

3. In combination, a mass of sponge rubber impregnated with electrically conductive material and having cells filled with gas, a pair of probes extending into said mass of material, and a flexible fluid impervious sheath for said mass.

4. In combination, a mass of sponge rubber relatively uniformly impregnated with carbonaceous material and with gas, a pair of probes extending into said mass at separated points, and a sheath of flexible fluid impervious material sealing said gas within said mass.

5. In combination, a cell comprising a mass of gas pervious electrically conductive deformable material, a pair of probes inserted therein, and a flexible sheath sealing gas within said mass of gas pervious material and preventing exit or entry of fluid therein and therefrom, said sheath and said gas pervious material being extensible in response to decrease of pressure externally of said cell by said gas within said gas pervious material.

6. In combination, a cell comprising a mass of gas pervious electrically conductive deformable material having gas filled interstices therein, a pair of probes inserted in said material, and a flexible fluid impervious sheath sealing said mass of material, said sheath and said gas pervious material being expandable by said gas in response to decrease of pressure externally of said cell.

7. In combination, a cell comprising a mass of sponge rubber impregnated with electrically conductive material and having cells filled with gas, a pair of probes extending into said mass of material, and a flexible fluid impervious sheath for said mass, said sheath being expandable by said gas in response to decrease of pressure externally of said cell.

8. In combination, a cell comprising a mass of sponge rubber relatively uniformly impregnated with carbonaceous material and with gas, a pair of probes extending into said mass at separated points, and a sheath of flexible fluid impervious material sealing said gas within said mass, said sheath and said sponge rubber being expandable by said gas in response to decrease of pressure externally of said cell.

HYMAN HURVITZ.

REFERENCES CITED

The following references are of record in the file of this patent:

UNITED STATES PATENTS

| Number | Name | Date |
|---|---|---|
| 2,042,606 | Kotowski | June 2, 1936 |
| 2,305,717 | La Bell | Dec. 22, 1942 |

FOREIGN PATENTS

| Number | Country | Date |
|---|---|---|
| 12,510 | Australia | May 9, 1933 |
| 263,634 | Great Britain | Jan. 6, 1927 |